UNITED STATES PATENT OFFICE.

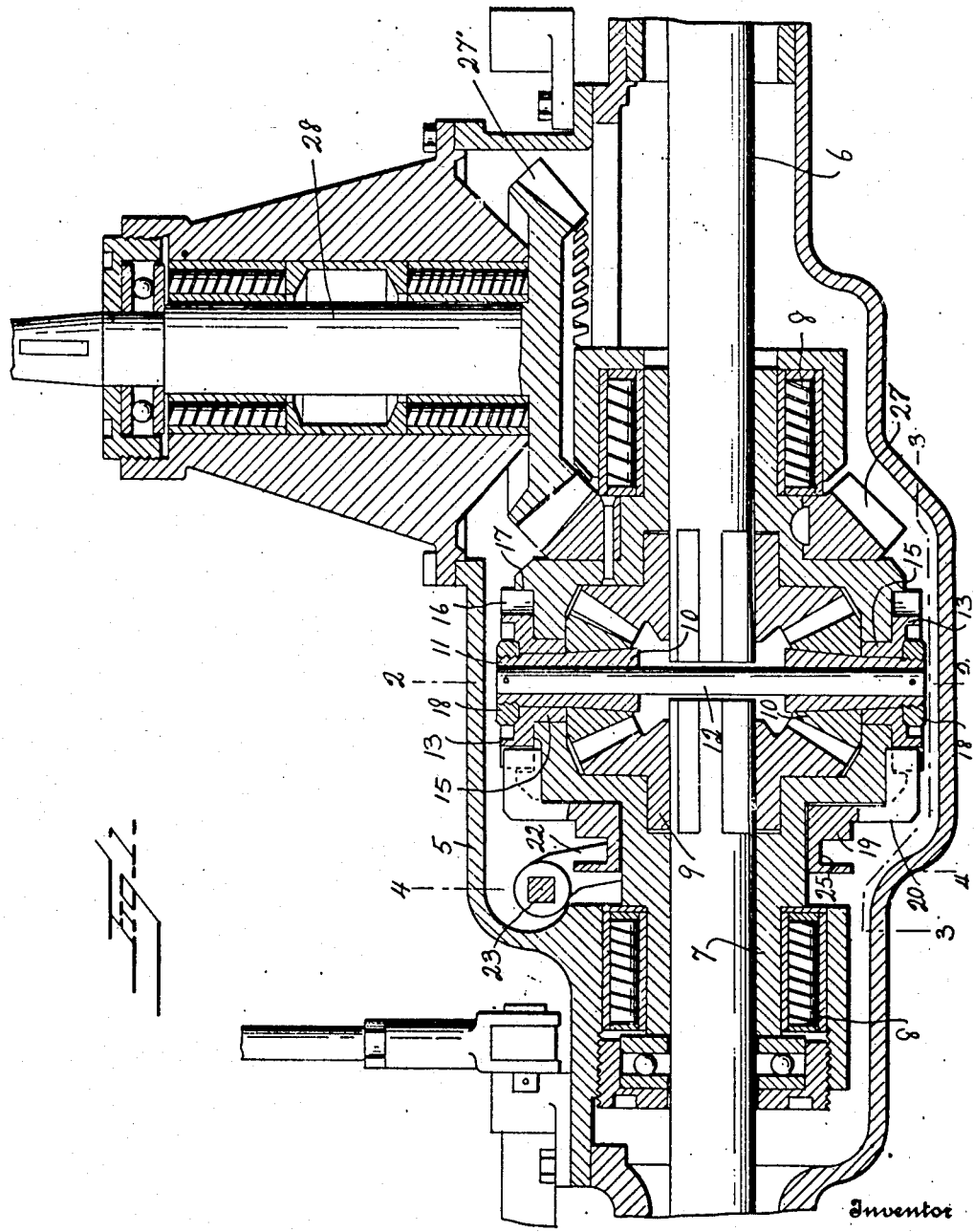

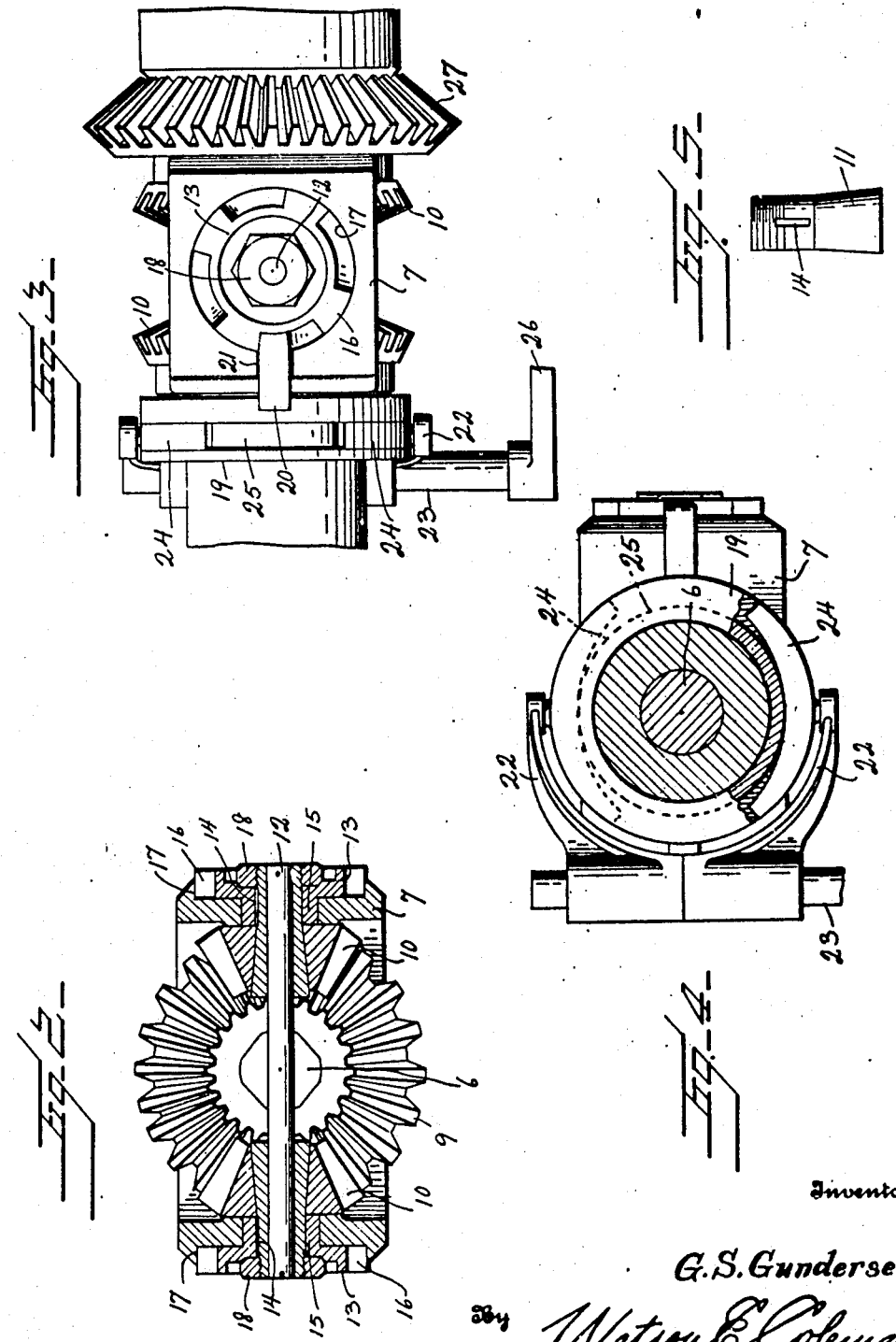

GILBERT S. GUNDERSEN, OF FORT WAYNE, INDIANA.

DIFFERENTIAL GEAR AND LOCK FOR MOTOR-VEHICLE-TRANSMISSION SYSTEMS.

1,317,286.   Specification of Letters Patent.   Patented Sept. 30, 1919.

Application filed October 19, 1918. Serial No. 258,876.

*To all whom it may concern:*

Be it known that I, GILBERT S. GUNDERSEN, a citizen of the United States, residing at Fort Wayne, in the county of Allen and State of Indiana, have invented certain new and useful Improvements in Differential Gears and Locks for Motor-Vehicle-Transmission Systems, of which the following is a specification, reference being had to the accompanying drawings.

This invention relates to an improved differential gear and means for a lock for motor driven vehicle drive wheel transmission systems, and has for its primary object to provide locking means controllable by the driver of the car whereby the frictional road contact of the driving wheels under varying road conditions may be balanced to effect an unequal distribution of the driving power and obviate skidding or slipping of the wheels on the road surface.

It is another important object of the invention to provide a locking device for the above purpose which is applicable to the standard type of differential gearing to lock the differentiating pinions and place the driving strain for which the gears are designed properly, and without increasing the braking strain upon the gears above that of which they were designed for when the lock is in use.

It is also another object of my invention to provide adjusting means for the differential pinion locking devices having positive engagement therewith, whereby the pinions when locked are caused to rotate as a unit with the drive gears, said adjustable friction means operating to automatically shift the driving power from the drive wheel having little frictional tractive contact with the road surface, to the wheel having the greatest friction contact.

And it is also an additional object of the invention to provide a simple and durably constructed differential gear lock which may be quickly and completely released to permit of independent rotation of the drive wheels and thereby obviate the possibility of stripping the gears or breakage of the other parts and excessive wear on tires when touring a car.

With the above and other objects in view, the invention consists in the improved construction, combination and relative arrangement of the several parts as will be hereinafter more particularly described, subsequently claimed and illustrated in the accompanying drawings in which similar reference characters designate corresponding parts throughout the several views, and wherein:—

Figure 1 is a longitudinal section through the differential gear casing illustrating one practical embodiment of the invention;

Fig. 2 is a section taken on the line 2—2 of Fig. 1;

Fig. 3 is a section taken on the line 3—3 of Fig. 1, the locking arms being shown in dotted lines in their released positions;

Fig. 4 is a section taken on the line 4—4 of Fig. 1; and

Fig. 5 is a detail elevation of the adjustable pinion sleeve.

Referring in detail to the drawing, 5 designates the differential gear case, and 6 the drive wheel axles which are mounted in a housing or boxing 7 arranged within the case 5, said boxing inclosing the differential gearing and being supported upon suitable bearings, shown at 8, for bodily rotation. Upon the opposed ends of the drive axles 6, the beveled gears 9 are keyed or otherwise suitably fixed. These gears have meshing engagement with the diametrically opposed differential pinions 10. In the illustrated embodiment of my invention, I have indicated two of these differential pinions, but it is to be understood that, if desired, in practice a greater number of the pinions may be employed.

Each of the pinions 10 has frictional engagement upon the larger end of a tapered sleeve 11, said sleeves being engaged upon the relatively opposite ends of a guide pin or rod 12 which extends at right angles to the axle sections 6 and between the opposed ends thereof. A collar 13 is keyed upon the outer or smaller end of each of the sleeves 11, as shown at 14, the collar having a hub 15 extending through an opening in the wall of the gear housing or boxing 7 and in contact with one of the pinions 10. Each of the collars 13 is formed with a plurality of spaced, radially projecting teeth or lugs 16 and is engaged in a seat or recess 17 formed in the outer face of the boxing 7. The outer end of each of the tapered sleeves 11 is threaded to receive an adjusting nut 18, the said nut bearing against the face of the collar 13. By adjusting the nuts 18 upon the sleeves 11, it will be readily understood that said sleeves may be moved through the pinions 10 and collars 13 and the frictional binding engagement of the larger end of said sleeves in the bores of the pinions regulated as desired.

Upon one of the longitudinal hub extensions of the boxing 7, a shiftable collar 19 is loosely engaged and this collar carries oppositely extending, diametrically opposed arms 20, the outer ends of which are angularly disposed in parallel relation to the drive axle and provided with tapering extremities, shown at 21. These angular end portions of the arms 20 are freely movable in the grooves or channels 21 formed in the wall of the boxing 7 and are adapted to enter between the teeth or lugs 16 on the collars 13.

The arms 22 of an operating yoke are fixed upon a transversely disposed rock shaft 23 mounted in the wall of the casing 5. The yoke arms are provided with shifter segments, shown at 24, which are loosely mounted on the arms and engaged in the annular groove or channel 25 of the collar 19. An arm 26 is fixed upon one end of the shaft 23, and may be connected by means of a rod or other suitable means (not shown) to an operating lever conveniently mounted and arranged adjacent to the operator's seat.

Upon the other longitudinal hub extension of the boxing 7, a beveled gear 27 is fixed with which the gear 27 on the end of the power transmission shaft 28 has meshing engagement.

My improved differential and lock as above described is primarily designed for use in connection with commercial motor cars or trucks, it is designed also to be employed upon pleasure vehicles of the three or four differential pinion type. It is the purpose of the present invention to reduce the construction cost of commercial service cars providing for an all year service car with positive driven multiple drive wheels, motor cars, trucks and tractors of the internal driving gear type which provides a relatively high speed in the differential gearing by a six or seven to one reduction ratio at the wheels. This in connection with the safety friction pinion hub lock, positively protects the parts against liability to breakage when lock is used and also relieves the wheel tires of road wear caused by slipping; and saves time lost by being stalled by the slipping of drive wheels in sand and mud and snow and ice encountered by them.

Under ordinary operating or road conditions, it will be understood that the lock collar carrying the arms 20 is in its released position the differential operates freely and the friction between the adjustable sleeves 11 and the pinions 10 is not used; the pinions revolve freely on their hubs in the differential case so that the differential gearing and the drive axle 6 will apply the power to the drive wheels properly in turning corners with a car, which requires the power to be applied at different drive wheel speeds. When road conditions are perfect and the wheels driven at different speeds upon the road surface, and when the operator actuates the rock shaft 23 to shift the collar 19 to engage the arms thereof between the lugs or teeth of the respective collars 13, thus locking the collars which are keyed to the sleeves against rotation independent of the gear 10, the retarding influence of the frictional contact between the pinions 10 and sleeves 11 to the rotation of said pinions relative to the gears 9, serves to counterbalance the variable frictional contact of the drive wheels upon the road surface. At the same time, this frictional mounting and adjustment for the pinions 10 is an insurance against the possible breakage of the differential gears while the locking device is in use. When the drive wheels have different degrees of frictional surface contact on the road all parts will rotate as a unit, one wheel cannot slip independent of the other and the car cannot skid as the driving power is automatically shifted to the wheel having the greater frictional road contact, as the pinions 10 in such case will be rotated upon the respective sleeves 11 against the retarding influence of the frictional contact between the same and the sleeves 11; thus, the skidding of the vehicle with the possibility of serious injury thereto will be avoided. In case one of the drive wheels should become deadlocked, the frictional mounting of the pinions 10 will permit of the rotation of the other drive wheel in the use of this locking device. These pinions equally divide the driving strain for which the differential gearing is designed and by the proper adjustment of the friction sleeves 11, the locking strain may be adjusted to the weight and gear reduction of a car and by thus providing a device which will automatically balance the driving power transmitted to the wheels in accordance with the tractive road contact grip required by the respective wheels on the road surface excessive wear upon the wheel tires is avoided and greater mileage service obtained from the tires with this differential and this differential lock which is a free differential and a positive multiple wheel drive, with a safety breakage protection.

From the foregoing description, taken in connection with the accompanying drawings, it is believed that the construction, manner of operation and the advantages of my improved differential gear lock will be clearly and fully understood. The several parts of the device are very simple and compact in their arrangement, not liable to get out of order, and adaptable to the standard type of motor vehicle differential gearing. In practice the device is effective and reliable for the purpose in view. By tapering the ends of the locking arms 20 as above described, the release of the differential gears are positively effected and liability of the locking arms sticking or wedging between the lugs on the locking collars is obviated. I may provide any additional number of the lugs 16 on the locking collars which may be found advisable. The form, proportion and relative arrangement of the various other elements may likewise be modified and it is, therefore, accordingly to be understood that I reserve the privilege of adopting all such legitimate changes in these respects, as may be embodied within the spirit and scope of the invention as claimed.

I claim:—

1. In a differential gear and lock, a housing, differential gear and pinion elements pivotally mounted in the housing, a friction mounting for each of the pinion elements including means rotatable therewith for locking the differential pinions, and means on the housing wall for controlling said lock, the action of the lock to cause a positive multiple wheel drive or an independent wheel drive as the tractive contact of the drive wheels may require to propel a vehicle.

2. In a differential and a lock for motor vehicles, a gear housing, differential gear elements, a safety friction means coacting with the gear elements and rotatably supporting the same upon the wall of the housing, and means to lock said friction means against rotation to direct the driving power to the driving wheels under different road conditions, said differential gear elements being rotated by safety friction means upon a variation in the tractive contact of the drive wheels with the ground.

3. In a differential and a lock for motor vehicles, a gear housing, differential gear elements, axially adjustable members rotatably mounted in the wall of the housing and frictionally coacting with the respective gear elements to protect the latter from breakage, and manually operable locking means mounted upon the housing to hold said members against rotation and lock the gear elements within the housing and thereby distribute the driving power to the drive wheels of the vehicle regardless of wheel road contact, said gear elements rotating relative to said members upon a variation in the tractive contact of the drive wheels with the ground when it is required.

4. In a differential and a lock for motor vehicles, a gear housing, sleeve gear hubs rotatably mounted in the wall of said housing, differential gear elements frictionally engaged upon said sleeves, means for axially adjusting the sleeves to vary the frictional contact of the pinions with the gear elements to a point within the breaking strain limit of the teeth of gear, locking means for said sleeves including a part fixed to the outer end of each sleeve, and manually operable means mounted upon the housing to engage said parts whereby the gear elements are locked against rotation under difficult road conditions but are rotated upon the respective sleeves against the frictional retarding influence upon an excessive variation in the tractive contact of the drive wheels with the ground.

5. In a differential and a lock for motor vehicles, a gear housing, sleeve gear hubs rotatably mounted in the wall of said housing, differential gear elements frictionally engaged upon said sleeves, means for axially adjusting the sleeves to vary the frictional contact of the pinions with the gear elements, locking means for said sleeves, a collar fixed on the outer end of each sleeve and having spaced lugs, and manually operable locking arms shiftably mounted on the housing for engagement between said lugs whereby the gear elements are locked against rotation under difficult road conditions, said elements being rotated on the respective sleeves against the excessive retarding frictional influence upon a variation in the tractive contact of the drive wheels with the ground.

6. In a differential and a lock for motor vehicles, a gear housing, collars rotatably mounted in the wall of the gear housing, taper sleeves keyed in said collars, differential gear elements frictionally engaged on each sleeve, means for adjusting the sleeves through said collars to vary the frictional locking engagement of the sleeves with the gear elements, and locking means shiftable upon the housing to coact with said collars and hold the sleeves against rotation whereby the gear elements are locked under difficult road conditions, said elements rotating on the respective variation in the tractive contact of the drive wheels with the ground.

7. In a differential lock for motor vehicles, a gear housing, collars rotatably mounted in the wall of the gear housing and each having spaced lugs, sleeves keyed in said collars for rotation therein, differential gear elements frictionally engaged on the sleeves, means for adjusting the sleeves through the collars for varying the frictional locking engagement of the sleeves with said gear elements, and manually operable means shiftable upon the housing and having locking arms for engagement between the spaced lugs on said collars whereby the gear elements are locked against rotation under difficult road conditions, said elements rotating upon the respective sleeves against the excessive retarding frictional influence in the variation of the tractive contact of the drive wheels with the ground.

In testimony whereof I hereunto affix my signature in the presence of two witnesses.

GILBERT S. GUNDERSEN.

Witnesses:
L. A. TODD,
CHARLES E. COLBINK.